United States Patent [19]

Connor

[11] Patent Number: 4,664,277
[45] Date of Patent: May 12, 1987

[54] BONDED CLOSURE ASSEMBLY

[75] Inventor: John T. Connor, Schwenksville, Pa.

[73] Assignee: The West Company, Phoenixville, Pa.

[21] Appl. No.: 865,150

[22] Filed: May 20, 1986

Related U.S. Application Data

[63] Continuation of Ser. No. 767,358, Aug. 20, 1985, abandoned, which is a continuation of Ser. No. 475,689, Mar. 14, 1983, abandoned.

[51] Int. Cl.⁴ .............................................. B65D 41/42
[52] U.S. Cl. .................................................. 215/249
[58] Field of Search ........................ 215/249, 250, 251

[56] References Cited

U.S. PATENT DOCUMENTS 3,587,897  6/1971  Rohde .................................. 215/249
4,265,364  5/1981  Baba ................................... 215/249
4,364,485  12/1982  Knapp ................................. 215/232

Primary Examiner—Donald F. Norton
Attorney, Agent, or Firm—Eugene E. Renz, Jr.

[57] ABSTRACT

A closure adapted to hold in place a stopper in a container comprising a cap of cup-like form made of metal and having at least a portion thereof covered by a bondable material, said portion being detachably secured by fracturable means and a cover member bonded to said detachable portion actuatable with respect to the outer portion of the cap to separate said portion along said fracturable means from the remainder of the cap.

9 Claims, 17 Drawing Figures

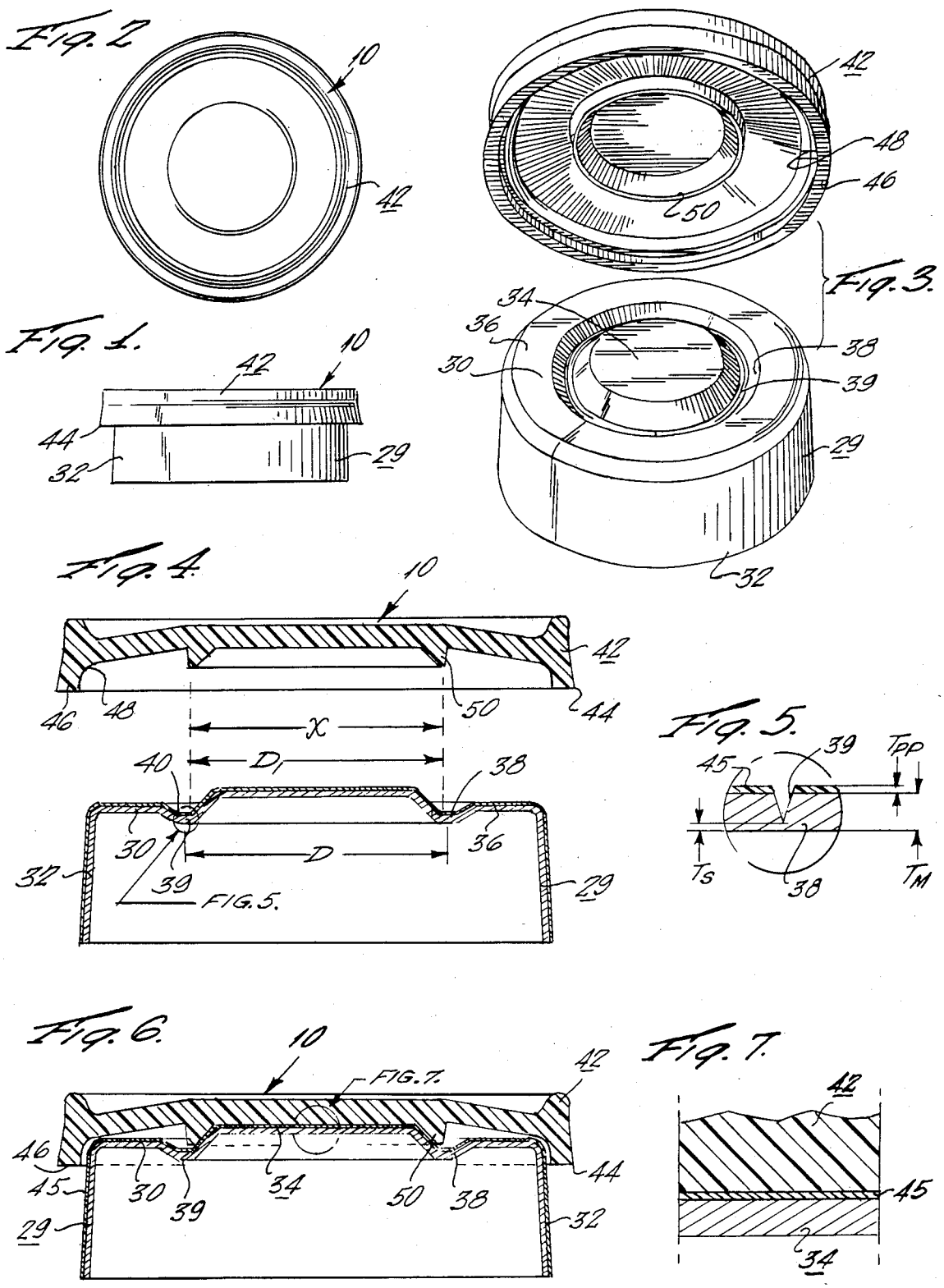

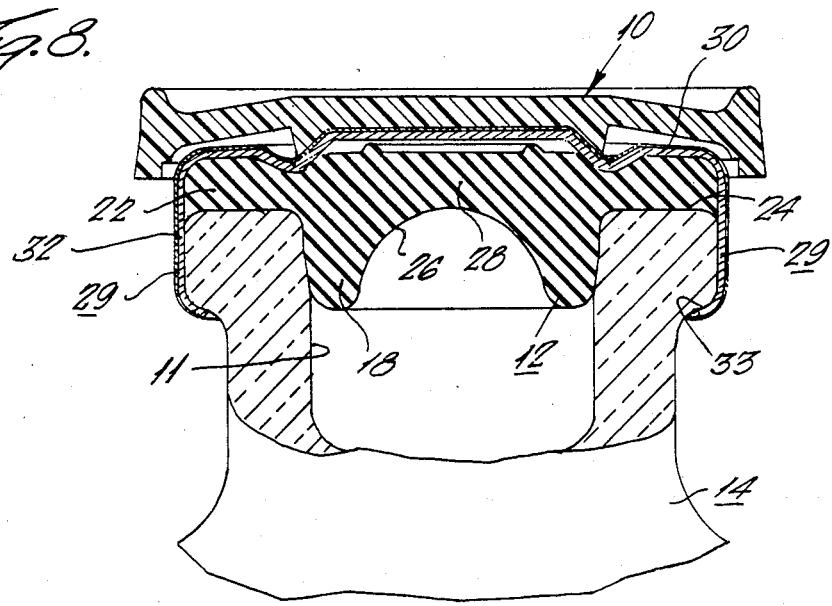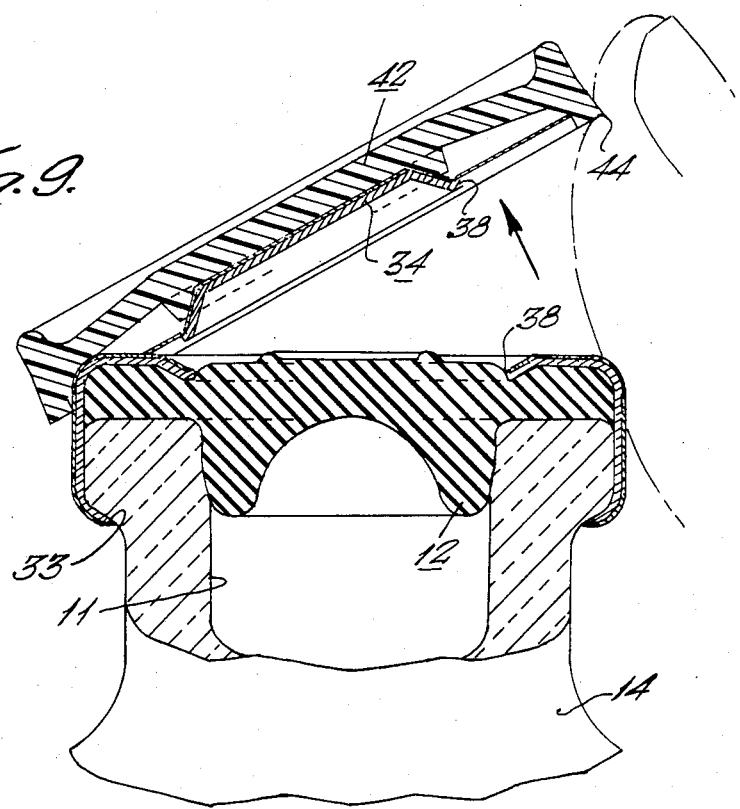

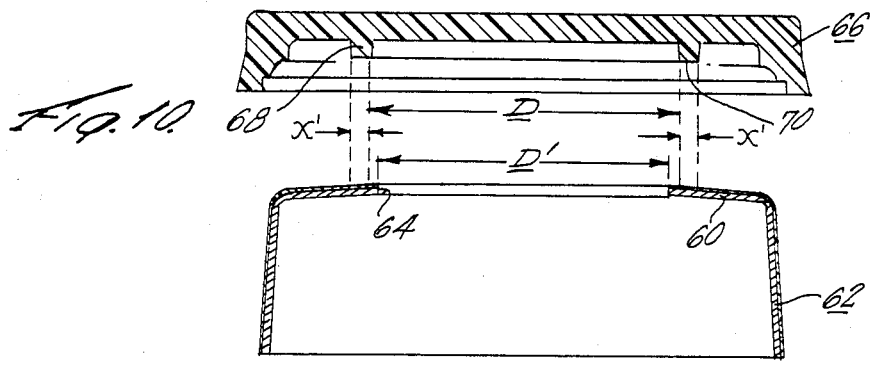
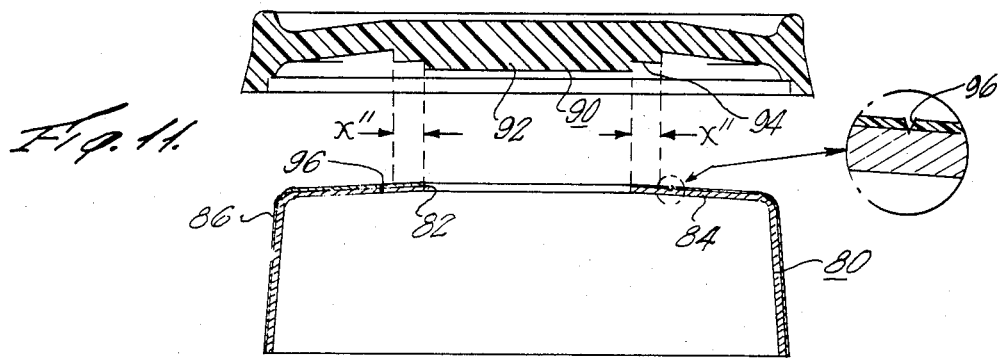
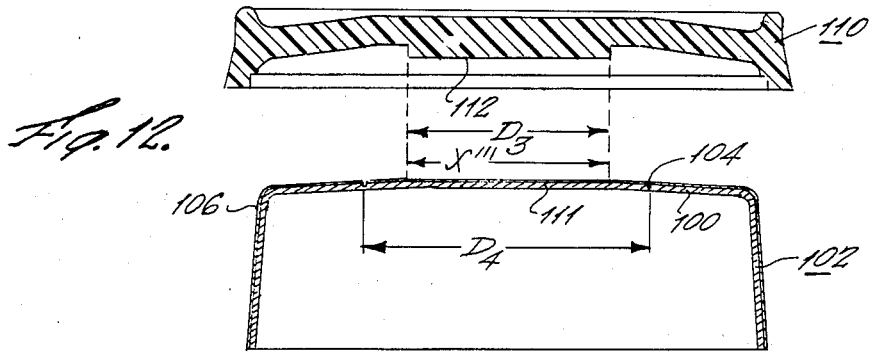
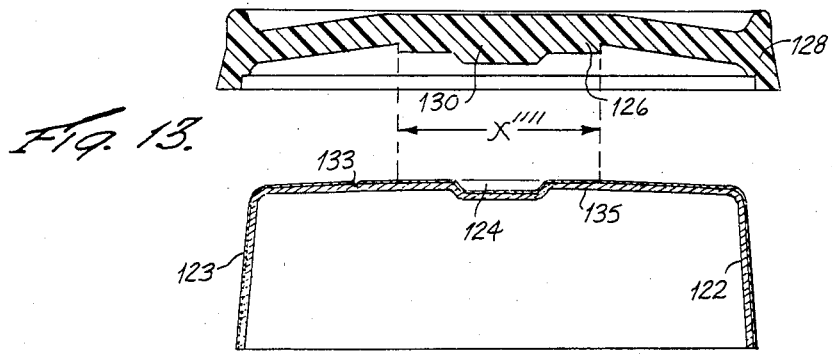

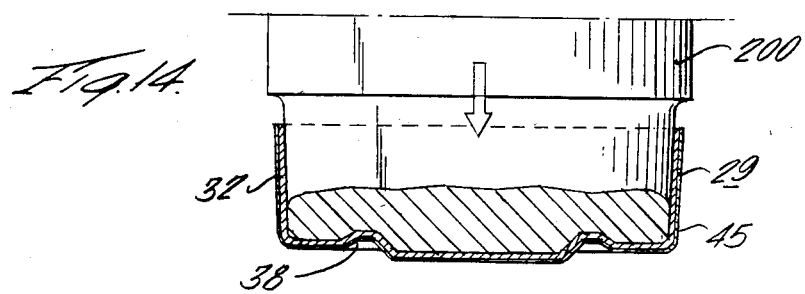
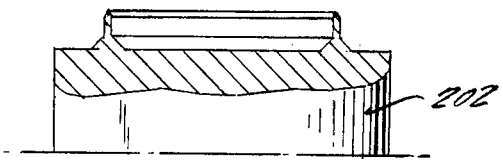
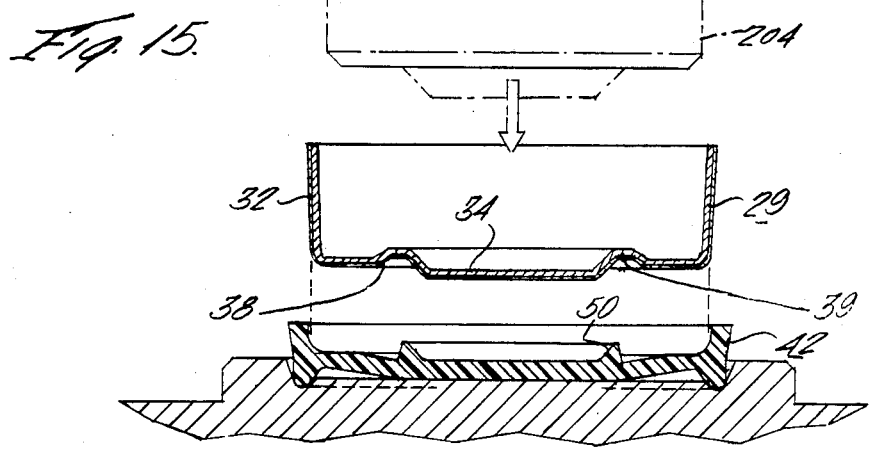
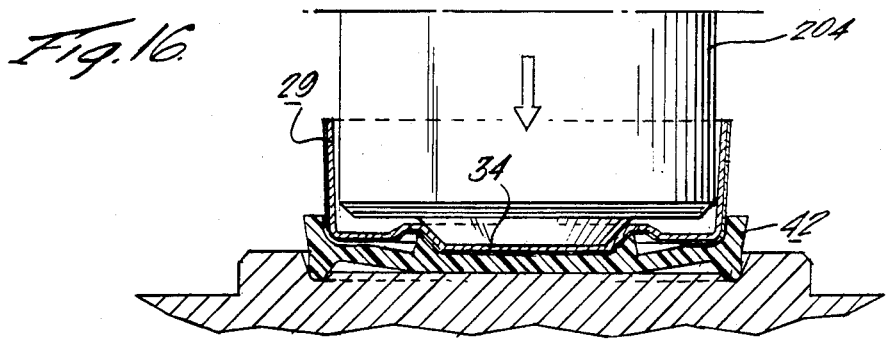
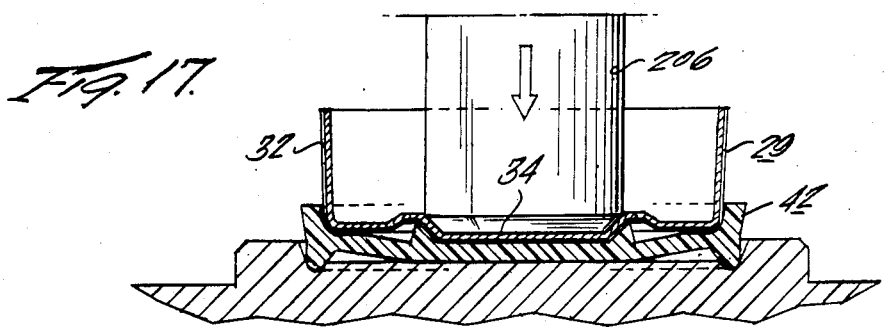

BONDED CLOSURE ASSEMBLY

This is a continuation of application Ser. No. 767,358 filed Aug. 20, 1985, now abandoned, which is a continuation of application 475,689 filed Mar. 14, 1983, now abandoned.

BACKGROUND AND SUMMARY OF THE INVENTION

The present invention relates to improvements in closures or caps for pharmaceutical containers or bottles and more specifically relates to a closure having a removable portion detachably secured to a new and improved means for securing the removable portion to the cap.

Cap-type closures for certain types of pharmaceutical containers usually incorporate a pierceable closure member such as a disc or stopper made of rubber which seats in the discharge opening in the container and is normally sealed by an outer cap which holds the stopper in place in most instances by engaging a shoulder on the neck of the bottle. These metal overcaps in the past have usually included a detachable cover element connected to a central removable disc portion of the metallic cap which is engageable by the user to pivot the cover element relative to the cap thereby fracturing the bridge means connecting the central disc to the outer portion of the metallic overcap and thereby expose the resilient stopper so that the contents can be withdrawn by piercing it with a hypodermic syringe.

Closure assemblies of this general type are not new per se. For example, in the Ravn U.S. Pat. No. 3,071,274, the outer plastic cover element has a central depending portion which engages through an opening in the removable disc portion of the overcap to normally hold it in place. When the cover element is pivoted by the thumb of the user, the disc which is connected to the outer cap by fracturable bridges is detached thereby exposing a circular area of the stopper seated in the discharge opening in the container. This closure while it has been extremely useful in the field, nevertheless has some slight disadvantages or drawbacks which the present invention overcomes. For example, it has been found that the jagged edges produced on removing the central disc portion presents some risk of injury if contacted by the hand of the user. Additionally, the force required to remove the disc may vary depending on the particular circumferential location where the cover element is engaged. Thus, the removal force may vary from one cap to the next which are all made according to the same nominal tolerances.

Subsequently issued patents owned by the Assignee of the present application show similar type closures with variations in the manner in which the cover element is secured to a removable disc of the metallic overcap. For example, in Anderson U.S. Pat. No. 3,358,865, the central removable disc portion is likewise connected to the outer portion of the metallic cap by circumferentially spaced fracturable bridges. However, in this instance the central disc portion has a raised button which engages through a central opening in the cap and is peened over to hold it in place. This cap assembly has some of the same shortcomings of the Ravn cap structure and is somewhat expensive to manufacture and assemble.

The Labarge U.S. Pat. No. 3,369,692 shows an assembly similar to that of the Anderson U.S. Pat. No. 3,358,865. However, in this instance the overcap is metallic and the throat of the button is non-circular so that the button and disc can be removed by twisting the cover element.

Herbert et al U.S. Pat. No. 3,547,297 again shows a closure assembly similar to those described above. However, in this instance the disc portion is connected by partial scoring to the outer portion of the metallic overcap. However, the cover element is connected to the removable disc portion in much the same manner as in the Ravn U.S. Pat. No. 3,071,274. This closure likewise has been found very suitable for the purposes intended. However, again it is somewhat expensive to manufacture and assemble. Furthermore, the opening in the metallic cap to receive the depending portion of the plastic cover element defines a pathway for ingress of foreign matter which presents the possibility of contamination of the stopper. In other words, while the partial scoring eliminates a possible path for contaminants such as bacteria and the like, the opening to accommodate the cover element defines another path and thus the entire closure does not in itself provide a complete hermetic seal by reason of the opening to accommodate the cover element.

Anderson U.S. Pat. No. 3,379,326 shows a number of embodiments wherein the cover element has depending legs or a continuous skirt which engages under the central opening in the metallic cap which are fracturable when the cover element is actuated relative to the metallic cap to expose the stopper. While this arrangement eliminates the jagged edges produced on fracturing metallic bridges connecting the central disc portion to the outer cap of some of the prior assemblies, it has been found that the cap assembly is nevertheless somewhat expensive to manufacture and assemble and in some of the embodiments the removal force may not be uniform at all locations of engagement of the cover element. Furthermore, the entire closure consisting of metallic cap and cover element does not provide a complete hermetic seal.

Other closure assemblies of interest are shown in the following additional prior patents:

| U.S. PAT. NO. | INVENTOR | ISSUE DATE |
|---|---|---|
| 3,193,128 | Ravn | July 6, 1965 |
| 3,446,170 | Andersen | May 27, 1969 |
| 3,587,897 | Rohde | June 28, 1971 |

With the foregoing in mind, it is an object of the present invention to provide a tamper-proof closure assembly of the above type which is characterized by novel features of construction and arrangement providing greater uniformity and control over the removal force required to separate the elements of the cap to expose a portion of a stopper or the like and which is more economical to manufacture and assemble than the prior closures discussed above.

Another object is to provide a closure cap assembly which is truly tamper-evident and provides a truly hermetic seal.

To this end, the closure assembly comprises a metallic overcap having a top and a depending skirt which is adapted to be crimped under the finish on a container to hold a rubber stopper in place and a top including in the principal embodiments a removable portion defined by a bridge connection in the form of partial scoring. The outer surface of the metallic overcap which is preferably made of aluminum is coated with a thin plastic film such as polypropylene or covered with a plastic-based lacquer such as a polypropylene-based lacquer. In instances where the metallic overcap is coated with a thin plastic film or layer, the coating is preferably of a thickness of about one (1) mm and in instances where the metallic overcap is provided with a plastic base lacquer film, the film is preferably in the range of about one-tenth (0.10) mm. The closure assembly further includes a cover or button preferably made of plastic having at least a portion thereof thermally or ultrasonically bonded to the removal portion of the metallic overcap so that in use, the cover is simply engaged by the thumb of the user at a peripheral edge and pivoted to fracture the removable portion along the bridge connection and expose the stopper. The cap assembly is easy and economical to manufacture and apply to containers. Moreover, the area bonding the button to the overcap may be selectively varied to control the seating force or bonding strength between the elements thereby to provide a uniform acceptable force for removal. The components of the assembly may be assembled by first sterilizing the individual components or can be sterilized after assembly to the container, a method commonly referred to as "terminal" sterilization. In either event, the area of the stopper exposed after actuation of the cover element is in a sterile condition. Additionally, the assembled closure is truly tamper-evident and provides a truly hermetic seal between the closure assembly and the container.

DESCRIPTION OF THE DRAWINGS

These and other objects of the present invention and the various features and details of a closure assembly in accordance with the present invention and the method for making the same are hereinafter more fully set forth with reference to the accompanying drawings, wherein:

FIG. 1 is a side elevational view of a closure assembly in accordance with the present invention prior to assembly to a container;

FIG. 2 is a top plan view thereof;

FIG. 3 is an enlarged exploded perspective showing the cover element removed from the metallic cap portion;

FIG. 4 is a transverse sectional view through the cap prior to assembly of the cover element;

FIG. 5 is an enlarged view of the portion circled in broken lines in FIG. 4;

FIG. 6 is a transverse sectional view of the assembled cover;

FIG. 7 is an enlarged fragmentary sectional view of the portion of the combined assembly circled in FIG. 6;

FIG. 8 is an enlarged view partly in section showing the closure assembly applied to a container such as a bottle for a medicament;

FIG. 9 is a view similar to FIG. 8 showing the cover element removed exposing the outer face of the rubber stopper;

FIGS. 10, 11, 12 and 13 are transverse sectional views of other embodiments of container closures in accordance with the present invention; and FIGS. 14–17 inclusive are schematic views showing the system or method for making a closure in accordance with the present invention.

DESCRIPTION OF THE PREFERRED EMBODIMENTS

Referring now to the drawings and particularly to FIGS. 1–9 thereof, there is illustrated a tamper-evident closure assembly in accordance with the present invention. The closure which is generally designated by the numeral 10 is adapted to hold a stopper 12 in place in the discharge opening 11 of a container such as the bottle 14 illustrated in FIGS. 8 and 9. This stopper 12 is of generally standard design and has a hollow plug portion 18 adapted to fit tightly within the opening 11 of the bottle and a top portion 22 which overlies the axial end face 24 of the bottle neck and seats against this end face 24. The plug portion 18 is recessed internally as shown at 26 to provide a central thin-wall portion 28 which may be pierced, for example, by the needle of a hypodermic syringe to gain access to the bottle contents. The stopper 12 may be of any conventional form and the present invention is not concerned with the particular design of the stopper.

The closure assembly which holds the stopper in place comprises an overcap 29 preferably made of sheet metal, such as aluminum, which is of generally cup-like form and has a top 30 and a depending peripheral skirt 32 which is adapted to be crimped under a shoulder 33 on the bottle finish to hold the overcap or cap 29 and stopper 12 in place. In the present instance, the top 30 has an upstanding dish-shaped central disc section 34 connected to an annular outer portion 36 of the top by slightly recessed annular indentation or annular groove 38. The central section 34 is detachably connected to the annular outer portion 36, in the present instance, by a continuous circular partial score line 39 formed in the outer face 40 of the groove 38 defining a circular breakaway zone wherein the overcap 29 is of reduced thickness or cross section $T_s$. The closure assembly further includes a cover member 42 preferably made of a plastic material, such as polypropylene connected to the central disc section 34 which, as illustrated in FIG. 9, may be engaged at its peripheral edge 44 by the thumb of the user to pivot the cover member 42 relative to the cap and separate the central disc section 34 from the remainder of the cap along the scoring 39 to expose the stopper so that it may be engaged by a syringe to withdraw the contents.

In accordance with the present invention, the cover member 42 is secured to the detachable disc portion 34 of the overcap by novel means providing a truly hermetic seal of the closure when it is holding the stopper in place and providing an assembly which is easy and economical to manufacture. To this end, the outer surface of the overcap 29 is provided with a thin layer of material 45 of predetermined thickness or cross section $T_{pp}$ at least in the area of the upstanding dished removable disc portion 34 which is securely bonded to the outer surface of the overcap by conventional means such as heat or the use of a bonding adhesive and is bonded to the cover member 42 by application of heat and pressure. It has been found that a layer of polypropylene suits this purpose. The cover member as shown in FIG. 4 is of generally disc-like form and has a short radially directed flange 46 at the outer peripheral edge of the top which has a rounded internal shoulder 48 to snugly embrace and conform to the juncture at the top and skirt of the overcap. The cover member 42 is also formed with a circular depending flange 50 defining a pocket 50a conforming to the contour of the upstanding dished-shaped section 34 of the top of the overcap. By this arrangement there is a large bonded surface area designated X between the cover member 42 and the polypropylene covered dished-section of the overcap within the boundaries defined by the scoring 39. This bond may be achieved by means of heat staking or ultrasonic welding. The large bonded surface area between the cover 42 and dish portion 34 of the overcap provides a strong bond of sufficient strength to ensure fracturing of the disc portion 34 of the overcap along the partial score line 39 upon pivotal actuation of the cover member relative to the cap in the manner shown in FIG. 9. The diameter D of the scoring 39 is preferably less than the diameter $D_1$ of the bonded area X. The bonded surface area X between the cover and the overcap may be selectively varied for a given cap size and the depth of the scoring may be selectively varied so that the removal force may be controlled within a predetermined range. However, in all instances, the bond between the cover 42 and the overcap is greater than the force to break the scoring 39 to ensure removal of the disc portion 34 of the overcap when actuating the cover element 42. The depth of the scoring is controlled so that there is no premature fracturing of the disc portion 34 of the cap during handling and in this way it survives various handling techniques in the manufacturing process and is relatively easy to remove when it is in use. In the embodiment described above, the cover and cap are self-aligning by reason of the dished configuration of the overcap and the pocket 50a formed in the cover member by the flange 50 for receiving the same so that the cover and cap may be easily and accurately processed in automatic high speed feed and assembly equipment.

The following are typical preferred dimensional relationships for a thirteen (13) millimeter closure in accordance with the present invention
D—Diameter of Scoring 39—0.211 inches
D1—Diameter of bonded area X—0.205 inches
$T_m$—Thickness or cross section of overcap 29—0.007 inches
$T_s$—Thickness or cross section of overcap at scored area 39—0.003-0.004 inches
$T_{pp}$—Thickness or cross section of plastic layer 45—1 mm
F—Removal force measured at periphery of cover 42—about 3.4 lbs.

The above dimensions and relationships may be selectively varied depending on the size of the closure.

The closure assembly in accordance with the present invention is easy and economical to manufacture. For example, circular discs of polypropylene-coated aluminum may be cut from flat sheet stock and shaped in a stamping operation to the desired configuration of the cap as illustrated in FIG. 4 for example. Thereafter, with reference to FIGS. 14-17 inclusive, the scoring 39 is formed in the shaped cap by positioning it, for example, in an upper forming die 200 which reciprocates against a lower scoring die or head 202 having a cutting edge 203. The scored cap is then ready for assembly to the cover element 42 which may be accomplished by a heat staking process as illustrated schematically in FIGS. 15 and 16 or by an ultrasonic bonding process as schematically illustrated in FIG. 17. As shown in FIG. 15, the cover element 42 is supported in a centering support element or jig 205. The cap is then positioned in place in the cover element. An electroheating element 204 having a shaped tip portion 204a conforming to the central removable disc portion of the cap is placed in contact therewith as illustrated in FIG. 16 to apply heat and pressure to the central zone. This produces the desired bonding action between the cover element and the outer polypropylene layer of the cap 29. Note that the portion of the cover element which lies radially outwardly of the partial scoring is spaced slightly from the outer annular top 30 of the overcap to prevent bonding of the cover element to the cap in this region or zone. The process illustrated schematically in FIG. 17 is essentially the same except that in this instance an ultrasonic head or tool 206 is utilized which heats only the removable disc portion to effect the desired localized bonding of the cover element to only the disc portion of the cap located radially inwardly of the scoring 39. The closure is then ready for assembly to a filled container by simply positioning it over the stopper and crimping the lower edge under the container or bottle finish.

In lieu of a polypropylene layer 45 bonded to the aluminum overcap, the overcap may be coated with a polypropylene lacquer. It is, of course, possible to coat the metal overcap with other hot melt adhesives which are commercially available.

Other embodiments of closure assemblies in accordance with the present invention are illustrated in FIGS. 10-13 inclusive which essentially embody the principle of the invention described above. In the embodiment of the invention illustrated in FIG. 10, the top 60 of the plastic-coated overcap 62 is provided with a central opening 64 and the cover member 66 has a circular depending flange 68 of an internal diameter D greater than the diameter D' of the opening 64 in the top of the overcap, the inner peripheral face 70 of the flange 68 being flat and forming the bonding surface to the overcap by application of heat and pressure in much the same manner as described above in connection with the principal embodiment. In accordance with this arrangement the bonding area X' is defined by the width of the face 70 of the overcap flange. This area X' can be made small providing an acceptable force to break the bond upon actuation of the cover member 66 in the manner described above to expose the surface of the stopper 12 for access to the contents of the container by means of a hypodermic syringe. This closure assembly is likewise capable of being manufactured easily and economically. The closure assembly also has all of the advantages of the principal embodiment previously described in that it provides a hermetic seal between the closure and the stopper and is truly tamper-evident by virtue of the fact that once the bond between the flange 68 of the cover element 66 and the surface of the top of the overcap is broken it can only be reestablished by application of heat and pressure.

In accordance with the embodiment of closure assembly shown in FIG. 11, the polypropylene-coated overcap 80 similar to the embodiment in FIG. 10 has a circular opening 82 in the top 84 and in this instance the outer plastic layer 86 is scored in a circular location as at 96 radially outwardly of the opening in the top of the overcap 80. In this instance, the cover member 97 has an axially depending projection 90 which is stepped to define a central plug portion 92 which snugly engages in the circular opening 82 of the overcap and defines a ring-like shoulder 94 outboard of the central depending plug portion 92 which is bonded to the overcap by application of heat and pressure. In this embodiment the partial scoring 96 is formed only in the plastic layer 86 and the overcap 80 which is preferably of aluminum is unscored and generally of uniform cross section. Note that the area of bonding X" lies inwardly of the partial scoring 96 in the plastic layer 86 of the overcap so that when the cover element is actuated to break the bond, the ring-like band of plastic breaks cleanly at the partial scoring and adheres to the cover element. Here as in the previously described embodiment, the bond area X" may be selectively varied for a given size closure assembly to provide a bonding force securing the cover member to the overcap which is greater than the force required to fracture the scoring 96. The engagement of the plug portion 92 in the opening facilitates proper alignment of the parts during the bonding process.

FIG. 12 shows a closure assembly similar to the principal embodiment in operation and function. However, in this instance, the top 100 of the overcap 102 is relatively flat and includes a partial score line 104 extending through the plastic layer 106 and partially into the aluminum top 100 to define a removable disc 111. The cover member 110 has a central depending projection 112 of a diameter $D_3$ less than the diameter $D_4$ of the disc 111 defined by the scoring 104 and it is over this area designated X''' of the face of the projection that the cover element is bonded to the overcap by application of heat and pressure in the manner described above. In this instance, actuation of the cover element fractures the overcap along the scored area, the bonding force in the area X''' holding the cover to the layer being greater than the force required to fracture the disc 111 along the partial score line 104.

FIG. 13 is similar to the embodiment illustrated in FIG. 12 except that in this instance the top 120 of the overcap 122 which has a plastic layer 123 bonded thereto has a shallow inwardly dished portion 124 and the projection 126 on the cover element 128 has a complementary shaped pilot portion 130 which seats in the dished cavity in the overcap. Here again the bonding force securing the cover element to the overcap in the area designated X'''' is greater than the force required to fracture the central disc portion 135 defined by the scoring 133 so that upon removal, the cover element and disc portion 135 defined by the scoring 133 remain intact, secured to one another and a central opening formed in the overcap upon actuation of the cover element 128 to remove the disc 135. In this instance the scoring 133 penetrates the plastic layer 123 and top 120 of the overcap for access via a hypodermic syringe to the contents of the container. The nesting of the pilot portion 130 in the dished cavity of the disc portion 135 aligns the parts accurately for the bonding process.

It is noted that the cover element and overcap of the embodiments of FIGS. 10-13 inclusive may be assembled and bonded to form an integral unit in generally the manner described in connection with the principal embodiment and as illustrated schematically in FIGS. 14-17 inclusive.

While particular embodiments of the present invention have been illustrated and described herein, it is not intended to limit the invention and changes and modifications may be made therein within the scope of the following claims.

Even though the preferred embodiments of closures in accordance with the present invention illustrated above incorporates a metal cap made of easily fabricatable aluminum, coated or filmed with a polypropylene plastic material, it is to be understood that the cap may be made of other materials such as various types of plastics which are capable of being bonded by ultrasonic or other means to the cover member in the manner described above to provide the desired localized bonding of the cover member to the cap.

What is claimed is:

1. A closure for a container comprising a cap of cup-like form having a top portion and a depending circumferentially extending skirt, a thin layer of bondable material covering the entire outer surface of said cap, said top portion including an inner central portion detachably secured by fracturable means to an outer portion of said top portion, a plastic cover member securely attached through application of heat and pressure to said inner central portion by the layer of bondable material therebetween, said inner central portion comprising a flat disc-like section and a downwardly divergent conical wall and said cover having a flat disc-like interior wall and circumferential projection having a conical surface complementing the conical wall of said inner central portion of the cap.

2. A closure as claimed in claim 1, wherein said fracturable means is formed on said outer surface of said cap.

3. A closure as claimed in claim 1, wherein said fracturable means comprises a continuous partial score defining generally said inner central portion of said cap.

4. A closure for a container comprising a cap of cup-like form having a top portion and a depending circumferentially extending skirt, a thin layer of bondable material covering at least the outer surface of the top portion of said cap, said top portion including an inner central portion detachably secured by fracturable means to an outer portion of said top portion, a plastic cover member securely attached through application of heat and pressure to said inner central portion by the layer of bondable material therebetween, said inner central portion comprising a flat disc-like section and a downwardly divergent conical wall and said cover having a flat disc-like interior wall and circumferential projection having a conical surface complementing the conical wall of said inner central portion of the cap.

5. A closure as claimed in claim 4, wherein said fracturable means is formed on said outer surface of said cap.

6. A closure as claimed in claim 4, wherein said fracturable means comprises a continuous partial score defining generally said inner central portion of said cap.

7. A closure for a container comprising a cap of cup-like form having a top portion and a depending circumferentially extending skirt, said top portion including an inner central portion detachably secured by fracturable means to an outer portion of said top portion, a thin layer of bondable material covering the outer surface of at least said inner central portion of said cap, a plastic cover member securely attached through application of heat and pressure to said inner central portion by the layer of bondable material therebetween, said inner central portion comprising a flat disc-like section and a downwardly divergent conical wall and said cover having a flat disc-like interior wall and circumferential projection having a conical surface complementing the conical wall of said inner central portion of the cap.

8. A closure as claimed in claim 7, wherein said fracturable means is formed on said outer surface of said cap.

9. A closure as claimed in claim 7, wherein said fracturable means comprises a continuous partial score defining generally said inner central portion of said cap.

* * * * *